United States Patent
Sekikawa et al.

(10) Patent No.: US 12,098,254 B2
(45) Date of Patent: Sep. 24, 2024

(54) GLASS FIBER-REINFORCED RESIN MOLDED ARTICLE

(71) Applicant: NITTO BOSEKI CO., LTD., Fukushima (JP)

(72) Inventors: Hironobu Sekikawa, Fukushima (JP); Ryo Sasaki, Fukushima (JP); Mao Takaizumi, Fukushima (JP)

(73) Assignee: Nitto Boseki Co., Ltd., Fukushima (JP)

( * ) Notice: Subject to any disclaimer, the term of this patent is extended or adjusted under 35 U.S.C. 154(b) by 548 days.

(21) Appl. No.: 17/424,040

(22) PCT Filed: Feb. 7, 2020

(86) PCT No.: PCT/JP2020/004895
§ 371 (c)(1),
(2) Date: Jul. 19, 2021

(87) PCT Pub. No.: WO2020/166518
PCT Pub. Date: Aug. 20, 2020

(65) Prior Publication Data
US 2022/0119600 A1    Apr. 21, 2022

(30) Foreign Application Priority Data
Feb. 12, 2019   (JP) ................... 2019-022877

(51) Int. Cl.
| | |
|---|---|
| C08K 7/14 | (2006.01) |
| C03C 3/087 | (2006.01) |
| C03C 3/112 | (2006.01) |
| C03C 13/00 | (2006.01) |
| C08J 5/04 | (2006.01) |

(52) U.S. Cl.
CPC ............... C08J 5/043 (2013.01); C03C 3/087 (2013.01); C03C 3/112 (2013.01); C03C 13/00 (2013.01); C08K 7/14 (2013.01); C08J 2367/02 (2013.01); C08K 2201/004 (2013.01)

(58) Field of Classification Search
CPC ...... C08K 7/14; C08K 2201/004; C08J 5/043; C08J 2367/02; C03C 3/087; C03C 3/112; C03C 13/00; C03C 3/118
USPC ........................................................ 524/494
See application file for complete search history.

(56) References Cited

U.S. PATENT DOCUMENTS

| | | | | |
|---|---|---|---|---|
| 6,346,568 | B1 * | 2/2002 | Maeda ................ | C08K 9/08 524/495 |
| 11,059,946 | B2 * | 7/2021 | Tsuchigane ........... | C08K 7/14 |
| 11,091,596 | B2 * | 8/2021 | Nukui ................. | C08J 5/043 |
| 11,827,770 | B2 * | 11/2023 | Nukui ................. | B29B 15/08 |
| 2004/0014586 | A1 * | 1/2004 | Otaki ................ | C03C 3/085 65/447 |
| 2022/0380577 | A1 * | 12/2022 | Nukui ................. | C08J 5/08 |
| 2023/0118488 | A1 * | 4/2023 | Nukui ................. | C08J 5/043 524/494 |
| 2023/0131534 | A1 * | 4/2023 | Sasamoto ............. | C08K 7/14 524/494 |
| 2023/0192991 | A1 * | 6/2023 | Sasaki ............... | C08L 71/10 524/494 |

FOREIGN PATENT DOCUMENTS

| | | |
|---|---|---|
| CN | 1903767 A | 1/2007 |
| CN | 101696089 A | 4/2010 |
| CN | 104529174 A | 4/2015 |
| JP | H01-051345 A | 2/1989 |
| JP | H01-201041 A | 8/1989 |
| JP | 3269937 B | 4/2002 |
| JP | 2004-189583 A | 7/2004 |
| JP | 3954125 B | 8/2007 |
| JP | 3954130 B | 8/2007 |
| JP | 4269194 B | 5/2009 |
| JP | 2012-166998 A | 9/2012 |
| JP | 2013-043942 A | 3/2013 |
| JP | 6468409 B | 2/2019 |
| JP | 6790812 B | 11/2020 |
| JP | 6927463 B | 9/2021 |
| WO | 2010/109721 A1 | 9/2010 |
| WO | 2012/118163 A1 | 9/2012 |

(Continued)

OTHER PUBLICATIONS

English Translation of WO 2019049526 (Year: 2019).*
Extended European search report dated Sep. 1, 2022 issued in the corresponding EP Patent Application No. 20756453.5.

(Continued)

*Primary Examiner* — Hannah J Pak
(74) *Attorney, Agent, or Firm* — Carrier, Shende & Associates P.C.; Fulchand P. Shende; Joseph P. Carrier

(57) ABSTRACT

Provided is a glass fiber-reinforced resin molded article including low dielectric constant and particularly low dielectric loss tangent, in a high-frequency region of 10 GHz or more. The glass fiber-reinforced resin molded article contains glass fiber in the range of 10 to 90% by mass and a resin in the range of 90 to 10% by mass with respect to the total amount of the glass fiber-reinforced resin molded article. The glass fiber includes a composition including 52.0 to 59.5% by mass of $SiO_2$, 17.5 to 25.5% by mass of $B_2O_3$, 9.0 to 14.0% by mass of $Al_2O_3$, 0.5 to 6.0% by mass of SrO, 1.0 to 5.0% by mass of MgO, 1.0 to 5.0% by mass of CaO, and 0.1 to 2.5% by mass of $F_2$ and $Cl_2$ with respect to the total amount of the glass fiber, and a number average fiber length is 1 to 10000 μm.

5 Claims, No Drawings

(56) References Cited

FOREIGN PATENT DOCUMENTS

WO      2017/171101 A1    10/2017
WO      2019/049526 A1    3/2019

OTHER PUBLICATIONS

Office Action dated Jun. 6, 2023 issued over the corresponding Japanese Patent Application No. 2020-572225 with the English machine translation thereof.

\* cited by examiner

GLASS FIBER-REINFORCED RESIN MOLDED ARTICLE

TECHNICAL FIELD

The present invention relates to a glass fiber-reinforced resin molded article.

BACKGROUND ART

Conventionally, glass fiber has been widely used in various applications to improve the strength of resin molded articles, and the resin molded articles have been increasingly used for a housing or a part of electronic devices such as a smartphone and a laptop computer.

In general, glass absorbs energy from alternating current as heat, and thus has a problem in that the above resin molded article generates heat when the resin molded article is used for a housing or a part of the above electronic devices.

The dielectric loss energy absorbed by glass is proportional to the dielectric constant and the dielectric loss tangent determined by the component and structure of the glass, and is represented by the following formula (1):

$$W = k f v^2 \times \varepsilon^{1/2} \tan \delta \quad (1)$$

wherein W is a dielectric loss energy, k is a constant, f is a frequency, $v^2$ is a potential gradient, $\varepsilon$ is a dielectric constant, and $\tan \delta$ is a dielectric loss tangent. From the above formula (1), it is found that the dielectric loss is larger and heat generation of the above resin molded article is larger as the dielectric constant and the dielectric loss tangent are higher and as the frequency is higher.

In order to reduce the dielectric loss energy of glass fiber-reinforced resin molded bodies, the applicant has filed a patent application directed to a glass fiber-reinforced resin molded article obtained by using glass fiber having a composition including $SiO_2$ in the range of 52.0 to 57.0% by mass, $Al_2O_3$ in the range of 13.0 to 17.0% by mass, $B_2O_3$ in the range of 15.0 to 21.5% by mass, MgO in the range of 2.0 to 6.0% by mass, CaO in the range of 2.0 to 6.0% by mass, $TiO_2$ in the range of 1.0 to 4.0% by mass, $F_2$ of less than 1.5% by mass, and $Li_2O$, $Na_2O$, and $K_2O$ of less than 0.6% by mass in total with respect to the total amount of the glass fiber, the glass fiber-reinforced resin molded article having a lower dielectric constant and a lower dielectric loss tangent (see Patent Literature 1).

CITATION LIST

Patent Literature

Patent Literature 1: International Publication WO No. 2017/171101

SUMMARY OF INVENTION

Technical Problem

In recent years, the size of data processed in electronic devices becomes larger and data communication among electronic devices becomes higher. In order to respond to these moves, use of higher frequencies of electrical signals has been promoted.

In the above formula (1), as the frequency f increases, in glass fiber-reinforced resin molded articles, parameters other than the frequency, especially the dielectric constant and the dielectric loss tangent are, particularly the dielectric loss tangent is required to be reduced in order to lower the dielectric loss energy.

Amid in this move, the glass fiber-reinforced resin molded article described in Patent Literature 1 has a disadvantage of insufficient reduction in the dielectric constant and dielectric loss tangent in a high-frequency region of 10 GHz or more.

In view of overcoming the disadvantage, it is an object of the present invention to provide a glass fiber-reinforced resin molded article that enables the dielectric constant and the dielectric loss tangent to be reduced and enables particularly the dielectric loss tangent to be markedly reduced, in a high-frequency region of 10 GHz or more.

Solution to Problem

In order to achieve the object, a glass fiber-reinforced resin molded article of the present invention is a glass fiber-reinforced resin molded article containing glass fiber in the range of 10 to 90% by mass and a resin in the range of 90 to 10% by mass with respect to the total amount of the glass fiber-reinforced resin molded article, wherein the glass fiber comprises a composition including $SiO_2$ in the range of 52.0 to 59.5% by mass, $B_2O_3$ in the range of 17.5 to 25.5% by mass, $Al_2O_3$ in the range of 9.0 to 14.0% by mass, SrO in the range of 0.5 to 6.0% by mass, MgO in the range of 1.0 to 5.0% by mass, CaO in the range of 1.0 to 5.0% by mass, and $F_2O$ and $Cl_2$ in the range of 0.1 to 2.5% by mass in total with respect to the total amount of the glass fiber, and the glass fiber has a number average fiber length of 1 to 10000 μm.

The glass fiber-reinforced resin molded article of the present invention, which contains glass fiber comprising the composition and the number average fiber length in the above content, can have a low dielectric constant and a low dielectric loss tangent, particularly a low dielectric loss tangent, in a high-frequency region of 10 GHz or more.

In the glass fiber-reinforced resin molded article of the present invention, the glass fiber included in the glass fiber-reinforced resin molded article preferably comprises a number average fiber length in the range of 100 to 450 μm. The glass fiber, which comprises a number average fiber length in this range, can simultaneously achieve excellent mechanical strength, a low dielectric constant and a low dielectric loss tangent of the glass fiber-reinforced resin molded article, and high production efficiency of the glass fiber-reinforced resin molded article.

In the glass fiber-reinforced resin molded article of the present invention, the glass fiber included in the glass fiber-reinforced resin molded article preferably comprises a number average fiber length in the range of 3 to 25 μm. The glass fiber, which comprises a number average fiber length in this range, can simultaneously achieve high fluidity, a low dielectric Constar, and a low dielectric loss tangent of the glass fiber-reinforced resin molded article.

In the glass fiber-reinforced resin molded article of the present invention, the resin included in the glass fiber-reinforced resin molded article is preferably a thermoplastic resin having a dielectric constant of less than 5.0, and more preferably a polybutylene terephthalate resin. Use of the thermoplastic resin can more reliably accomplish the low dielectric constant and the low dielectric loss tangent of the glass fiber-reinforced resin molded article. Particularly, use of a polybutylene terephthalate resin can simultaneously

DESCRIPTION OF EMBODIMENTS

Hereinafter, embodiments of e present invention will be described in detail.

A glass fiber-reinforced resin molded article of the present embodiment is a glass fiber-reinforced resin molded article containing glass fiber in the range of 10 to 90% by mass and a resin in the range of 90 to 10% by mass with respect to the total amount of the glass fiber-reinforced resin molded article, wherein the glass fiber comprises a composition including $SiO_2$ in the range of 52.0 to 59.5% by mass, $B_2O_3$ in the range of to 25.5% by mass, $Al_2O_3$ in the range of 9.0 to 14.0% by mass, SrO in the range of 0.5 to 6.0% by mass, MgO in the range of 1.0 to 5.0% by mass, CaO in the range of 1.0 to 5.0% by mass, and $F_2$ and $Cl_2$ in the range of 0.1 to 2.5% by mass in total with respect to the total amount of the glass fiber, and the glass fiber has a number average fiber length of 1 to 10000 μm.

The glass fiber-reinforced resin molded article of the present invention, which contains glass fiber comprising the composition, can have a low dielectric constant and a low dielectric loss tangent, particularly a low dielectric loss tangent, in a high-frequency region of 10 GHz or more.

When the glass fiber-reinforced resin molded article of the present embodiment has a content of the glass fiber of less than 10% by mass or a content of the resin exceeding 90% by mass with respect to the total amount of the glass fiber-reinforced resin molded article, it is not possible to obtain sufficient tensile strength and sufficient impact strength in the glass fiber-reinforced resin molded article. In contrast, when the glass fiber-reinforced resin molded article of the present invention has a content of the glass fiber of more than 90% by mass or a content of the resin of less than 10% by mass with respect to the total amount of the glass fiber-reinforced resin molded article, it is difficult to produce the glass fiber-reinforced resin molded article.

From the viewpoint of simultaneously achieving the strength of the molded article and ease of production of the molded article, the glass fiber-reinforced resin molded article of the present embodiment preferably contains the glass fiber in the range of 20 to 70% by mass and a resin in the range of 80 to 30% by mass, more preferably contains the glass fiber in the range of 25 to 60% by mass and a resin in the range of 75 to 40% by mass, and further preferably contains the glass fiber in the range of 30 to 50% by mass and a resin in the range of 70 to 50% by mass, with respect to the total amount of the glass fiber-reinforced resin molded article.

The glass fiber content in the glass fiber-reinforced resin molded article of the present embodiment can be calculated in compliance with JIS K 7052:1999.

In the glass fiber included in the glass fiber-reinforced resin molded article of the present embodiment, when the content of $SiO_2$ is less than 52.0% by mass with respect to the total amount of the glass fiber, the mechanical strength of the glass fiber is reduced, and thus, the strength of the molded article is reduced. On the other hand, in the glass fiber, the content of $SiO_2$ exceeds 59.5% by mass with respect to the total amount of the glass fiber, phase separation becomes likely to occur in the glass fiber, the chemical durability of the glass fiber deteriorates, and the homogeneity of the glass fiber is impaired. For this reason, the quality stability of the molded article is reduced.

In the glass fiber, the content of $SiO_2$ with respect to the total amount of the glass fiber is preferably in the range of 53.0 to 58.2% by mass, more preferably in the range of 53.4 to 57.4% by mass, further preferably in the range of 53.8 to 56.6% by mass, and particularly preferably in the range of 54.2 to 55.8% by mass.

In the glass fiber included in the glass fiber-reinforced resin molded article of the present embodiment, when the content of $B_2O_3$ is less than 17.5% by mass with respect to the total amount of the glass fiber, the dielectric constant and the dielectric loss tangent of the glass fiber cannot be sufficiently reduced, and thus, the dielectric constant and the dielectric loss tangent of the glass fiber-reinforced resin molded article cannot be sufficiently reduced. On the other hand, in the glass fiber, when the content of $B_2O_3$ exceeds 25.5% by mass with respect to the total amount of the glass fiber, phase separation becomes likely to occur in the glass fiber, the chemical durability of the glass fiber deteriorates, and the homogeneity of the glass fiber is impaired. For this reason, the quality stability of the molded article is reduced.

In the glass fiber, the content of $B_2O_3$ with respect to the total amount of the glass fiber is preferably in the range of 21.6 to 25.4% by mass, more preferably in the range of 22.0 to 25.2% by mass, further preferably in the range of 22.4 to 25.0% by mass, particularly preferably in the range of 22.8 to 24.8% by mass, and most preferably in the range of 23.2 to 24.6% by mass.

In the glass fiber included in the glass fiber-reinforced resin molded article of the present embodiment, when the content of $Al_2O_3$ with respect to the total amount of the glass fiber is less than 9.0% by mass, phase separation becomes likely to occur in the glass fiber, the chemical durability of the glass fiber deteriorates, and the homogeneity of the glass fiber is impaired. For this reason, the quality stability of the molded article is reduced. On the other hand, in the glass fiber, when the content of $Al_2O_3$ with respect to the total amount of the glass fiber exceeds 14.0% by mass, the dielectric constant and the dielectric loss tangent of the glass fiber cannot be sufficiently reduced, and thus, the dielectric constant and the dielectric loss tangent of the glass fiber-reinforced resin molded article cannot be sufficiently reduced.

In the glass fiber, the content of $Al_2O_3$ with respect to the total amount of the glass fiber is preferably in the range of 10.0 to 13.5% by mass, more preferably in the range of 10.4 to 13.2% by mass, further preferably in the range of 10.8 to 12.9% by mass, particularly preferably in the range of 11.2 to 12.6% by mass, and most preferably in the range of 11.6 to 12.3% by mass.

In the glass fiber included in the glass fiber-reinforced resin molded article of the present embodiment, when the content of SrO is less than 0.5% by mass or exceeds 6.0% by mass with respect to the total amount of the glass fiber, the dielectric constant and the dielectric loss tangent of the glass fiber cannot be sufficiently reduced, and thus, the dielectric constant and the dielectric loss tangent of the glass fiber-reinforced resin molded article cannot be sufficiently reduced.

In the glass fiber, the content of SrO with respect to the total amount of the glass fiber is preferably in the range of 2.0 to 5.0% by mass, more preferably in the range of 2.4 to 4.8% by mass, further preferably in the range of 2.8 to 4.6% by mass, particularly preferably in the range of 3.2 to 4.4% by mass, and most preferably in the range of 3.6 to 4.2% by mass.

In the glass fiber included in glass fiber-reinforced resin molded article of the present embodiment, when the content of MgO with respect to the total amount of the glass fiber is less than 1.0% by mass, stable glass fiber manufacturing becomes difficult, and the quality stability of the glass fiber is reduced. For this reason, the quality stability of the molded article is reduced. On the other hand, in the glass fiber, when the content of MgO with respect to the total amount of the glass fiber exceeds 5.0% by mass, the dielectric constant and the dielectric loss tangent of the glass fiber cannot be sufficiently reduced, and thus, the dielectric constant and the dielectric loss tangent of the glass fiber-reinforced resin molded article cannot be sufficiently reduced.

In the glass fiber, the content of MgO with respect to the total amount of the glass fiber is preferably in the range of 1.5 to 3.0% by mass, more preferably in the range of 16 to 2.8% by mass, further preferably in the range of 1.7 to 2.6% by mass, particularly preferably in the range of 1.8 to 2.4% by mass, and most preferably in the range of 1.9 to 2.2% by mass.

In the glass fiber included in the glass fiber-reinforced resin molded article of the present embodiment, when the content of CaO with respect to the total amount of the glass fiber is less than 1.0% by mass, stable glass fiber manufacturing becomes difficult, and the quality stability of the glass fiber is reduced. For this reason, the quality stability of the molded article is reduced. On the other hand, in the glass fiber, when the content of CaO with respect to the total amount of the glass fiber exceeds 5.0% by mass, the dielectric constant and the dielectric loss tangent of the glass fiber cannot be sufficiently reduced, and thus, the dielectric constant and the dielectric loss tangent of the glass fiber-reinforced resin molded article cannot be sufficiently reduced.

In the glass fiber, the content of CaO with respect to the total amount of the glass fiber is preferably in the range of 1.5 to 3.0% by mass, more preferably in the range of 1.6 to 2.8% by mass, further preferably in the range of 1.7 to 2.6% by mass, particularly preferably in the range of 1.8 to 2.4% by mass, and most preferably in the range of 1.9 to 2.2% by mass.

In the glass fiber included in the glass fiber-reinforced resin molded article of the present embodiment, when the total content of $F_2$ and $Cl_2$ with respect to the total amount of the glass fiber is less than 0.1% by mass, stable glass fiber manufacturing becomes difficult, and the quality stability of the glass fiber is reduced. For this reason, the quality stability of the molded article is reduced. On the other hand, in the glass fiber, when the total content of $F_2$ and $Cl_2$ with respect to the total amount of the glass fiber exceeds 2.5% by mass, phase separation becomes likely to occur in the glass fiber, the chemical durability of the glass fiber deteriorates, and the homogeneity of the glass fiber is impaired. For this reason, the quality stability of the molded article is reduced.

In the glass fiber, the total content of $F_2$ and $Cl_2$ with respect to the total amount of the glass fiber is preferably in the range of 0.3 to 2.0% by mass, more preferably in the range of 0.4 to 1.8% by mass, further preferably in the range of 0.5 to 1.6% by mass, particularly preferably in the range of 0.6 to 1.4% by mass, and most preferably in the range of 0.7 to 1.2% by mass.

In the glass fiber, the content of $F_2$ with respect to the total amount of the glass fiber is preferably in the range of 0.1 to 2.5% by mass, more preferably in the range of 0.3 to 2.0% by mass, further preferably in the range of 0.4 to 1.8% by mass, especially preferably in the range of 0.5 to 1.6% by mass, particularly preferably in the range of 0.6 to 1.4% by mass, and most preferably in the range of 0.7 to 1.2% by mass.

In the glass fiber, when the content of $F_2$ with respect to the total amount of the glass fiber is 0.4% by mass or more, $Cl_2$ may not be substantially included (i.e., the content of $Cl_2$ may be less than 0.01% by mass).

The glass fiber included in the glass fiber-reinforced resin molded article of the present embodiment may include $TiO_2$ in the range of 0 to 6.0% by mass with respect to the total amount of the glass fiber. When $TiO_2$ is contained, the viscosity of the glass fiber melt at high temperatures can be lowered, and glass fiber of stable quality is easily manufactured. When the glass fiber includes $TiO_2$, the glass fiber preferably includes $TiO_2$ in the range of 1.0 to 3.0% by mass with respect to the total amount of the glass fiber.

The glass fiber included in the glass fiber-reinforced resin molded article of the present embodiment may include $P_2O_5$ in the range of 0 to 5.0% by mass with respect to the total amount of the glass fiber. $P_2O_5$ contributes to reduction in the dielectric constant and the dielectric loss tangent of the glass fiber. When the glass fiber includes $P_2O_5$, the glass fiber preferably includes $P_2O_5$ in the range of 2.5 to 4.5% by mass with respect to the total amount of the glass fiber.

The glass fiber included in the glass fiber-reinforced resin molded article of the present embodiment may include $Fe_2O_3$ in the range of 0 to 3.0% by mass with respect to the total amount of the glass fiber. When $Fe_2O_3$ is contained, bubbles included in the glass fiber can be suppressed, and glass fiber of stable quality is easily manufactured. When the glass fiber includes $Fe_2O_3$, the glass fiber preferably includes $Fe_2O_3$ in the range of 0.1 to 0.6% by mass with respect to the total amount of the glass fiber.

The glass fiber included in the glass fiber-reinforced resin molded article of the present embodiment may include $SnO_2$ in the range of 0 to 1.0% by mass with respect to the total amount of the glass fiber. When $SnO_2$ is contained, bubbles included in the glass fiber can be suppressed, and glass fiber of stable quality is easily manufactured. When the glass fiber includes $SnO_2$, the glass fiber preferably includes $SnO_2$ in the range of 0.1 to 0.6% by mass with respect to the total amount of the glass fiber.

It is acceptable for the glass fiber included in the glass fiber-reinforced resin molded article of the present embodiment to include ZnO if the content of ZnO is less than 3.0% by mass with respect to the total amount of the glass fiber.

It is acceptable for the glass fiber included in the glass fiber-reinforced resin molded article of the present embodiment to include $Na_2O$, $K_2O$, and $Li_2O$ if the total content is less than 1.0% by mass and the content of each of the components is less than 0.4% by mass with respect to the total amount of the glass fiber.

It is acceptable for the glass fiber included in the glass fiber-reinforced resin molded article of the present embodiment to include $ZrO_2$ if the content of $ZrO_2$ is less than 0.4% by mass with respect to the total amount of the glass fiber.

It is acceptable for the glass fiber included in the glass fiber-reinforced resin molded article of the present embodiment to include $Cr_2O_3$ if the content of $Cr_2O_3$ is less than 0.05% by mass with respect to the total amount of the glass fiber.

The glass fiber included in the glass fiber-reinforced resin molded article of the present embodiment may include, as impurities attributable to raw materials, less than 1.0% by mass of oxides of Ba, P, Mn, Co, Ni, Cu, Mo, W, Ce, Y, and La in total with respect to the total amount of the glass.

In the glass fiber included in the glass fiber-reinforced resin molded article of the present embodiment, the content X of $B_2O_3$ (% by mass), the content Y of $Al_2O_3$ (% by mass), the content Z of SrO (% by mass), and the total content W of $F_2$ and $Cl_2$ (% by mass) satisfy the following formula (2).

$$38.0 \leq (W^{1/8} \times X^3 \times Y)/(1000 \times Z^{1/2}) \leq 95.0 \quad (2)$$

In the glass fiber included in the glass fiber-reinforced resin molded article of the present embodiment, the W, X, Y, and Z preferably satisfy the following formula (3).

$$50.0 \leq (W^{1/8} \times X^3 \times Y)/(1000 \times Z^{1/2}) \leq 90.0 \quad (3)$$

In the glass fiber included in the glass fiber-reinforced resin molded article of the present embodiment, the W, X, Y, and Z more preferably satisfy the following formula (4).

$$60.0 \leq (W^{1/8} \times X^3 \times Y)/(1000 \times Z^{1/2}) \leq 88.0 \quad (4)$$

In the glass fiber included in the glass fiber-reinforced resin molded article of the present embodiment, the W, X, Y, and Z further preferably satisfy the following formula (5).

$$70.0 \leq (W^{1/8} \times X^3 \times Y)/(1000 \times Z^{1/2}) \leq 86.0 \quad (5)$$

In the glass fiber included in the glass fiber-reinforced resin molded article of the present embodiment, the W, X, Y, and Z particularly preferably satisfy the following formula (6).

$$75.0 \leq (W^{1/8} \times X^3 \times Y)/(1000 \times Z^{1/2}) \leq 85.0 \quad (6)$$

In the glass fiber included in the glass fiber-reinforced resin molded article of the present embodiment, the W, X, Y, and Z most preferably satisfy the following formula (7).

$$78.0 \leq (W^{1/8} \times X^3 \times Y)/(1000 \times Z^{1/2}) \leq 84.5 \quad (7)$$

Regarding measurement of the content of each component described above in the glass fiber included in the glass fiber-reinforced resin molded article of the present embodiment, the content of Li as the light element can be measured with an ICP emission spectroscopic analyzer, and the contents of the other elements can be measured with a wavelength dispersive X-ray fluorescence analyzer.

The measurement method is as follows. First, a glass batch (prepared by mixing glass raw material) or glass fiber (when organic matter adheres to the surface of the glass fiber, or when glass fiber is mainly included as a reinforcing material in organic matter (resin), the glass fiber is used after the organic matter is removed by, for example, heating for about 2 to 24 hours in a muffle furnace at 300 to 600° C.) is placed in a platinum crucible and melted with stirring while being held at a temperature of 1550° C. for 6 hours in an electric furnace to obtain a homogeneous molten glass. Next, the obtained molten glass is poured onto a carbon plate to produce a glass cullet, and then pulverized into powder. Regarding Li as a light element, glass powder is thermally decomposed with an acid and then quantitatively analyzed using an ICP emission spectroscopic analyzer. Regarding other elements, glass powder is molded into a disc shape by a pressing machine and then quantitatively analyzed using a wavelength dispersive X-ray fluorescence analyzer. These quantitative analysis results are converted in terms of oxides to calculate the content of each component and the total amount, and the above content (% by mass) of each component, can be determined from these numerical values.

Supplying a glass raw material (glass batch) prepared to have the above composition, based on the content of components included in ores to be the glass raw material, the content of each component and the amount of each component volatilized in the melting process, to a melting furnace allows glass having the above composition to be prepared.

The glass fiber included in the glass fiber-reinforced resin molded article of the present embodiment comprises a dielectric constant of less than 4.6 and a dielectric loss tangent of 0.0021 or less, and preferably comprises a dielectric constant in the range of 4.0 to 4.5 and a dielectric loss tangent in the range of 0.0010 to 0.0020, at a measurement frequency of 10 GHz.

In the glass fiber-reinforced resin molded article of the present embodiment, when the number average fiber length of the glass fiber included in the glass fiber-reinforced resin molded article is less than 1 μm, sufficient mechanical strength cannot be obtained in the glass fiber-reinforced resin molded article. It is difficult to set the number average fiber length of the glass fiber to more than 10000 μm because breakage of the glass fiber may occur in the process of producing the glass fiber-reinforced resin molded article.

In the glass fiber-reinforced resin molded article of the present embodiment, from the viewpoint of simultaneously achieving excellent mechanical strength of the glass fiber-reinforced resin molded article, a low dielectric constant and a low dielectric loss tangent, and high production efficiency of the glass fiber-reinforced resin molded article, the number average fiber length of the glass fiber included in the glass fiber-reinforced resin molded article is preferably in the range of 100 to 450 μm, more preferably in the range of 120 to 400 μm, further preferably in the range of 140 to 350 μm, particularly preferably in the range of 150 to 330 μm, and most preferably in the range of 160 to 300 μm. The glass fiber-reinforced resin molded article having a number average fiber length of the glass fiber in this range has an excellent balance between the production efficiency and the strength. Thus, a combination of such a glass fiber-reinforced resin molded article with a resin such as a polybutylene terephthalate resin is suitable for applications such as housings for portable electronic devices. In order to achieve an excellent balance between the production efficiency and the strength, the content of the glass fiber in the glass fiber-reinforced resin molded article having a number average fiber length of the glass fiber in this range is preferably 30 to 60% by mass.

In the glass fiber-reinforced resin molded article of the present embodiment, from the viewpoint of simultaneously achieving high fluidity, a low dielectric constant, and a low dielectric loss tangent of the glass fiber-reinforced resin molded article, the number average fiber length of the glass fiber included in the glass fiber-reinforced resin molded article is preferably in the range of 3 to 25 μm, more preferably in the range of 5 to 23 μm, further preferably in the range of 7 to 2:2 μm, particularly preferably in the range of 9 to 21 μm, and most preferably in the range of 10 to 20 μm. The glass fiber-reinforced resin molded article having a number average fiber length of the glass fiber in this range has high fluidity. Thus, a combination of such a glass fiber-reinforced resin molded article with a resin such as a polybutylene terephthalate resin is suitable for applications such as micro parts in portable electronic devices. In order to further enhance the fluidity, the content of the glass fiber in the glass fiber-reinforced resin molded article having a number average fiber length of the glass fiber in this range is preferably 10 to 40% by mass.

The glass fiber comprising the above glass composition is produced as follows. First, a glass raw material (glass batch) prepared to have the above composition, based on the content of components included in ores or the like to be the glass raw material, the content of each component and the amount of each component volatilized in the melting process, is supplied to a melting furnace and melted at a temperature in the range of 1450 to 1550° C., for example. Then, the melted glass batch (melted glass) is drawn from 1 to 20000 nozzle tips of a bushing controlled at a predetermined temperature and rapidly cooled to form glass filaments. Subsequently, the glass filaments formed are applied with a sizing agent or binder using an applicator as an application apparatus. While 1 to 20000 of the glass filaments are bundled using a bundling shoe, the glass filaments are wound on a tube at a high speed using a winding apparatus to obtain glass fiber. Here, the cross-sectional shape of glass filaments is usually circular, but allowing the nozzle tip to have a non-circular shape and to have a protrusion or a notch for rapidly cooling the molten glass and controlling the temperature condition can provide glass filaments having a flat cross-sectional shape. Adjusting the diameter of the nozzle tip, winding speed, temperature conditions, and the like can adjust the fiber diameter in the case where the glass filaments each have a circular cross-sectional shape or the minor axis and major axis of the glass filaments in the case where the glass filaments each have a flat cross-sectional shape. For example, accelerating the winding speed can make the fiber diameter or the minor axis and major axis smaller, and reducing the winding speed can make the fiber diameter or the minor axis and major axis larger.

The cross-sectional shape of the glass filaments is usually circular. In the case where the glass filaments each have a flat cross-sectional shape, the filaments may take a long-oval shape (a shape obtained by replacing each of the shorter sides of a rectangular shape by a semicircle of which the diameter corresponding to the shorter sides), an oval shape, and a rectangular shape.

The fiber diameter of the glass filaments may be in the range of 3.0 to 35.0 μm in the case where the cross-sectional shape is circular. When the glass filaments each have a flat cross-sectional shape, the minor axis of the glass filaments ranges from 2.0 to 20.0 μm, the major axis ranges from 3.0 to 45.0 μm, and the ratio of the major axis to the minor axis (major axis/minor axis) ranges from 2.0 to 10.0. The fiber diameter (converted fiber diameter) when the cross-sectional area is converted to a perfect circle may range from 3.0 to 35.0 μm. The average value of the fiber diameters of glass filaments constituting the glass fiber may be referred to as the fiber diameter of the glass fiber.

The glass fiber, which includes a plurality of glass filaments bundled, comprises a weight in the range of 1 to 10000 tex (g/km).

In the glass fiber-reinforced resin molded article of the present embodiment, the glass fiber included in the glass fiber-reinforced resin molded article of the present embodiment is usually present being dispersed in a glass filament state.

In the glass fiber-reinforced resin molded article of the present embodiment, the glass fiber may be coated with an organic matter on the surface thereof for the purposes such as improvement of adhesiveness between glass fiber and a resin, and improvement of uniform dispersibility of glass fiber in a mixture of glass fiber and a resin or inorganic material. Examples of such an organic matter can include urethane resins, epoxy resins, vinyl acetate resins, acrylic resins, modified polypropylene (particularly carboxylic acid-modified polypropylene), and a copolymer of (poly) carboxylic acid (particularly maleic acid) and an unsaturated monomer.

In the glass fiber-reinforced resin molded article of the present embodiment, the glass fiber may be coated with the resin composition including a silane coupling agent, a lubricant, a surfactant, and the like in addition to these resins. Such a resin composition covers the glass fiber at a rate of 0.1 to 2.0 wt % based on the mass of the glass fiber in a state where it is not coated with the resin composition.

The glass fiber can be coated with an organic matter by applying the sizing agent or the binder containing the resin solution or the resin composition solution to the glass fiber using a known method such as a roller applicator, for example, in the manufacturing process of the glass fiber and then drying the glass fiber to which the resin solution or the resin composition solution is applied.

Examples of the silane coupling agent include aminosilanes (such as γ-aminopropyltriethoxysilane, N-β-(aminoethyl)-β-aminopropyltrimethoxysilane, N-β-(aminoethyl)-N'-β-(aminoethyl)-β-aminopropyltrimethoxysilane, and γ-anilinopropyltrimethoxysilane), chlorosilanes (such as γ-chloropropyltrimethoxysilane), epoxysilanes (such as γ-glycidoxypropyltrimethoxysilane, and β-(3,4-epoxycyclohexyl)ethyltrimethoxysilane), mercaptosilanes (such as γ-mercaptotrimethoxysilane), vinylsilanes (such as vinyltrimethoxysilane and N-β-(N-vinylbenzylaminoethyl)-γ-aminopropyltrimethoxysilane), acrylsilanes (such as γ-methacryloxypropyltrimethoxysilane), and cationic silanes (such as N-(vinylbenzyl)-2-aminoethyl-3-aminopropyltrimethoxysilane hydrochloride and N-phenyl-3-aminopropyltrimethoxysilane hydrochloride). As the silane coupling agent, these compounds can be used singly or in combination of two or more.

Examples of the lubricant include modified silicone oil, animal oils (such as beef tallow) and hydrogenated product thereof, vegetable oils (such as soybean oil, coconut oil, rapeseed oil, palm oil, and castor oil) and hydrogenated products thereof, animal waxes (such as beeswax and lanolin), vegetable waxes (such as candelilla wax and carnauba wax), mineral waxes (such as paraffin wax and montan wax), condensates of a higher saturated fatty acid and a higher saturated alcohol (such as stearates such as lauryl stearate), polyethyleneimine, polyalkylpolyamine alkylamide derivatives, fatty acid amides (e.g., dehydrated condensates of polyethylenepolyamines such as diethylenetriamine, triethylenetetramine, and tetraethylenepentamine and fatty acids such as lauric acid, myristic acid, palmitic acid, and stearic acid), and quaternary ammonium salts (such as alkyltrimethylammonium salts such as lauryltrimethylammonium chloride). As the lubricant, these can be used singly or in combinations of two or more.

Examples of the surfactant include nonionic surfactants, cationic surfactants, anionic surfactants, and amphoteric surfactants. As the surfactant, these compounds can be used singly or in combination of two or more.

Examples of the nonionic surfactant include ethylene oxide propylene oxide alkyl ether, polyoxyethylene alkyl ether, polyoxyethylene-polyoxypropylene-block copolymer, alkyl polyoxyethylene-polyoxypropylene block copolymer ether, polyoxyethylene fatty acid ester, polyoxyethylene fatty acid monoester, polyoxyethylene fatty acid diester, polyoxyethylene sorbitan fatty acid ester, glycerol fatty acid ester ethylene oxide adduct, polyoxyethylene castor oil ether, hydrogenated castor oil ethylene oxide adduct, alkylamine ethylene oxide adduct, fatty acid amide ethylene oxide adduct, glycerol fatty acid ester, polyglycerol fatty acid ester, pentaerythritol fatty acid ester, sorbitol fatty acid ester, sorbitan fatty acid ester, sucrose fatty acid ester, polyhydric alcohol alkyl ether, fatty acid alkanolamide, acetylene glycol, acetylene alcohol, ethylene oxide adduct of acetylene glycol, and ethylene oxide adduct of acetylene alcohol.

Examples of the cationic surfactant include alkyldimethylbenzylammonium chloride, alkyltrimethylammonium chloride, alkyl dimethyl ethyl ammonium ethyl sulfate, higher alkylamine salts (such as acetate and hydrochloride), adduct of ethylene oxide to a higher alkylamine, condensate of a higher fatty acid and polyalkylene polyamine, a salt of an ester of a higher fatty acid and alkanolamine, a salt of higher fatty acid amide, imidazoline cationic surfactant, and alkyl pyridinium salt.

Examples of the anionic surfactant include higher alcohol sulfate salts, higher alkyl ether sulfate salts, α-olefin sulfate salts, alkylbenzene sulfonate salts, α-olefin sulfonate salts, reaction products of fatty acid halide and N-methyl taurine, dialkyl sulfosuccinate salts, higher alcohol phosphate ester salts, and phosphate ester salts of higher alcohol ethylene oxide adduct.

Examples of the amphoteric surfactant include amino acid amphoteric surfactants such as alkali metal salts of alkylaminopropionic acid, betaine amphoteric surfactants such as alkyldimethylbetaine, and imidazoline amphoteric surfactants.

In the glass fiber-reinforced resin molded article of the present embodiment, the resin included in the glass fiber-reinforced resin molded article is a thermoplastic resin or thermosetting resin.

Examples of the above thermoplastic resin can include polyethylene, polypropylene, polystyrene, styrene/maleic anhydride resins, styrene/maleimide resins, polyacrylonitrile, acrylonitrile/styrene (AS) resins, acrylonitrile/butadiene/styrene (ABS) resins, chlorinated polyethylene/acrylonitrile/styrene (ACS) resins, acrylonitrile/ethylene/styrene (AES) resins, acrylonitrile/styrene/methyl acrylate (ASA) resins, styrene/acrylonitrile (SAN) resins, methacrylic resins, polyvinyl chloride (PVC), polyvinylidene chloride (PVDC), polyamide, polyacetal, polyethylene terephthalate (PET), polybutylene terephthalate (PBT), polytrimethylene terephthalate (PTT), polycarbonate, polyarylene sulfide, polyethersulfone (PES), polyphenylsulfone (PPSU), polyphenylene ether (PPE), modified polyphenylene ether (m-PPE), polyaryletherketone, liquid crystal polymer (LCP), fluororesins, polyetherimide (PEI), polyarylate (PAR), polysulfone (PSF), polyamideimide (PAI), polyaminobismaleimide (PABM), thermoplastic polyimide (TPI), polyethylene naphthalate (PEN), ethylene/vinyl acetate (EVA) resins, ionomer (IO) resins, polybutadiene, styrene/butadiene resins, polybutylene, polymethylpentene, olefin/vinyl alcohol resins, cyclic olefin resins, cellulose resins, and polylactic acid.

Specifically, examples of the polyethylene include high density polyethylene (HDPE), medium density polyethylene, low density polyethylene (LDPE), linear low density polyethylene (LLDPE), and ultra-high molecular weight polyethylene.

Examples of the polypropylene include isotactic polypropylene, atactic polypropylene, syndiotactic polypropylene, and mixtures thereof.

Examples of the polystyrene include general-purpose polystyrene (GPPS), which is an atactic polystyrene having an atactic structure, high impact polystyrene (HIPS) with a rubber component added to GPPS, and syndiotactic polystyrene having a syndiotactic structure.

Examples of the methacrylic resin include polymers obtained by homopolymerizing one of acrylic acid, methacrylic acid, styrene, methyl acrylate, ethyl acrylate, ethyl methacrylate, butyl acrylate, butyl methacrylate, and fatty acid vinyl ester, or polymers obtained by copolymerizing two or more of these.

Examples of the polyvinyl chloride include a vinyl chloride homopolymer, a copolymer of a vinyl chloride monomer and a copolymerizable monomer, or a graft copolymer obtained by graft polymerization of a vinyl chloride monomer to polymer polymerized by a conventionally known method such as emulsion polymerization method, suspension polymerization method, micro suspension polymerization method, or bulk polymerization method.

Examples of the polyamide can include one of components such as polycaproamide (nylon 6), polyhexamethylene adipamide (nylon 66), polytetramethylene adipamide (nylon 46), polytetramethylene sebacamide (nylon 410), polypentamethylene adipamide (nylon 56), polypentamethylene sebacamide (nylon 510), polyhexamethylene sebacamide (nylon 610), polyhexamethylene dodecamide (nylon 612), polydecamethylene adipamide (nylon 106), polydecamethylene sebacamide (nylon 1010), polydecamethylene dodecamide (Nylon 1012), polyundecanamide (Nylon 11), polyundecamethylene adipamide (Nylon 116), polydodecanamide (Nylon 12), polyxylene adipamide (nylon XD6), polyxylene sebacamide (nylon XD10), polymetaxylylene adipamide (nylon MXD6), polyparaxylylene adipamide (nylon PXD6), polytetramethylene terephthalamide (nylon 4T), polypentamethylene terephthalamide (nylon 5T), polyhexamethylene terephthalamide (nylon 6T), polyhexamethylene isophthalamide (nylon 6I), polynonamethylene terephthalamide (nylon 9T), polydecamethylene terephthalamide (nylon 10T), polyundecamethylene terephthalamide (nylon 11T), polydodecamethylene terephthalamide (nylon 12T), polytetramethylene isophthalamide (nylon 4I), polybis(3-methyl-4-aminohexyl) methane terephthalamide (nylon PACMT), polybis(3-methyl-4-aminohexyl) methane isophthalamide (nylon PACMI), polybis(3-methyl-4-aminohexyl) methane dodecamide (nylon PACM12), and polybis(3-methyl-4-aminohexyl) methane tetradecamide (nylon PACM14), or copolymers obtained by combining two or more of the components, and mixtures thereof.

Examples of the polyacetal include a homopolymer with oxymethylene units as the main repeating unit, and a copolymer mainly composed of oxymethylene units and containing oxyalkylene units having 2 to 8 adjacent carbon atoms in the main chain.

Examples of the polyethylene terephthalate include polymers obtained by polycondensation of terephthalic acid or a derivative thereof with ethylene glycol.

Examples of the polybutylene terephthalate include polymers obtained by polycondensation of terephthalic acid or a derivative thereof with 1,4-butanediol.

Examples of the polytrimethylene terephthalate include polymers obtained by polycondensation of terephthalic acid or a derivative thereof with 1,3-propanediol.

Examples of the polycarbonate include polymers obtained by a transesteriftcation method in which a dihydroxydiaryl compound is reacted with a carbonate such as diphenyl carbonate in a molten state; or polymers obtained by phosgene method in which a dihydroxyaryl compound is reacted with phosgene.

Examples of the polyarylene sulfide include linear polyphenylene sulfide, crosslinked polyphenylene sulfide having a high molecular weight obtained by performing a curing reaction after polymerization, polyphenylene sulfide sulfone, polyphenylene sulfide ether, and polyphenylene sulfide ketone.

Examples of the modified polyphenylene ether include: a polymer alloy of poly(2,6-dimethyl-1,4-phenylene)ether and polystyrene; a polymer alloy of poly(2,6-dimethyl-1,4- phenylene)ether and a styrenelbutadiene copolymer; a polymer alloy of poly(2,6-dimethyl-1,4-phenylene)ether and a styrene/maleic anhydride copolymer; a polymer alloy of poly(2,6-dimethyl-1,4-phenylene)ether and polyamide; and a polymer alloy of poly(2,6-dimethyl-1,4-phenylene)ether and styrene/butadiene/acrylonitrile copolymer.

Examples of the polyaryletherketone include polyetherketone (PEK), polyetheretherketone (PEEK), polyetherketoneketone (PEKK), and polyetheretherketoneketone (PEEKK).

Examples of the liquid crystal polymer (LCP) include a polymer (copolymer) composed of one or more structural units selected from aromatic hydroxycarbonyl units which are thermotropic liquid crystal polyesters, aromatic dihydroxy units, aromatic dicarbonyl units, aliphatic dihydroxy units, and aliphatic dicarbonyl units.

Examples of the fluororesin include polytetrafluoroethylene (PTFE), perfluoroalkoxy resins (PFA), fluorinated ethylene propylene resins (FEP), fluorinated ethylene tetrafluoroethylene resins (ETFE), polyvinyl fluoride (PVF), polyvinylidene fluoride (PVDF), polychlorotrifluoroethylene (PCTFE), and ethylene/chlorotrifluoroethylene resin (ECTFE).

Examples of the ionomer (10) resin include copolymers of an olefin or a styrene and an unsaturated carboxylic acid, wherein a part of carboxyl groups is neutralized with a metal ion.

Examples of the olefin/vinyl alcohol resin include ethylene/vinyl alcohol copolymers, propylene/vinyl alcohol copolymers, saponified products of ethylene/vinyl acetate copolymers, and saponified products of propylene/vinyl acetate copolymers.

Examples of the cyclic olefin resin include monocyclic compounds such as cyclohexene, polycyclic compounds such as tetracyclopentadiene, and polymers of cyclic olefin monomers.

Examples of the polylactic acid include poly-L-lactic acid, which is a homopolyrner of L-form, poly-D-lactic acid, which is a homopolymer of D-form, or a stereocomplex polylactic acid which is a mixture thereof.

Examples of the cellulose resin can include methylcellulose, ethylcellulose, hydroxycellulose, hydroxymethylcellulose, hydroxyethylcellulose, hydroxyethyl methylcellulose, hydroxypropyl methylcellulose, cellulose acetate, cellulose propionate, and cellulose butyrate. Examples of the above thermosetting resin can include unsaturated polyester resins, vinyl ester resins, epoxy (EP) resins, melamine (MF) resins, phenol resins (PF), urethane resins (PU), polyisocyanate, polyisocyanurate, polyimide (PI), urea (UF) resins, silicon (SI) resins, furan (FR) resins, benzoguanamine (BR) resins, alkyd resins, xylene resins, bismaleide triazine (BT) resins, and diallyl phthalate resin (PDAP).

Specifically, examples of the unsaturated polyester include resins obtained by esterification reaction of aliphatic unsaturated dicarboxylic acid and aliphatic diol.

Examples of the vinyl ester resin include bis vinyl ester resins and novolac vinyl ester resins.

Examples of the epoxy resin include bisphenol A epoxy resins, bisphenol F epoxy resins, bisphenol E epoxy resins, bisphenol S epoxy resins, bisphenol M epoxy resins (4,4'-(1,3-phenylenediisopropylidene)bisphenol epoxy resins), bisphenol P epoxy resins (4,4'-(1,4-phenylenediisopropylidene)bisphenol epoxy resins), bisphenol Z epoxy resins (4,4'-cyclohexadiene bisphenol epoxy resins), phenol novolac epoxy resins, cresol novolac epoxy resins, tetraphenol group ethane novolac epoxy resins, novolac epoxy resins having a condensed ring aromatic hydrocarbon structure, biphenyl epoxy resins, aralkyl epoxy resins such as xylylene epoxy resins and phenyl aralkyl epoxy resins, naphthylene ether epoxy resins, naphthol epoxy resins, naphthalene diol epoxy resins, bifunctional or tetrafunctional epoxy naphthalene resins, binaphthyl epoxy resins, naphthalene aralkyl epoxy resins, anthracene epoxy resins, phenoxy epoxy resins, dicyclopentadiene epoxy resins, norbornene epoxy resins, adamantane epoxy resins, and fluorene epoxy resins. Examples of the melamine resin include a polymer formed by polycondensation of melamine (2,4,6-triamino-1,3,5-triazine) and formaldehyde. Examples of the phenolic resin include novolac phenolic resins such as phenol novolac resins, cresol novolac resins, and bisphenol A novolac resins, resol phenol resins such as methylol resole resins and dimethylene ether resole resins, or aryl alkylene phenol resins, and include one of these or combinations of two or more.

Examples of the melamine resin include a polymer formed by polycondensation of melamine (2,4,6-triamino-1,3,5-triazine) and formaldehyde.

Examples of the phenolic resin include novolac phenolic resins such as phenol novolac resins, cresol novolac resins, and bisphenol A novolac resins, resol phenol resins such as methylol resole resins and dimethylene ether resole resins, or aryl alkylene phenol resins, and include one of these or combinations of two or more.

Examples of the urea resin include a resin obtained by condensation of urea and formaldehyde.

The above thermoplastic resin or the above thermosetting resin may be used singly or in combinations of two or more.

In order to more reliably accomplish the low dielectric constant and dielectric loss tangent of the glass fiber-reinforced resin molded article, the resin used in the glass fiber-reinforced resin molded article of the present embodiment is preferably a thermoplastic resin having a dielectric constant of less than 5.0, more preferably a resin selected from the group consisting of polybutylene terephthalate resins, polyetheretherketone resins, liquid crystal polymers, polyphenylene sulfide resins, polyamide resins, polyvinyl chloride resins, polyethylene resins, polypropylene resins, polystyrene resins, acrylonitrile styrene resins, polytriethyl methacrylate resins, polyvinylidene chloride resins, polycarbonate resins, polyphenylene ether resins, and polytetrafluctroethylene resins, further preferably a polybutylene terephthalate resin, a polyetheretherketone resin, or an polyamide resin, particularly preferably a polybutylene terephthalate resin or a polyetheretherketone resin, and most preferably a polybutylene terephthalate resin.

The dielectric constant of the resin can be measured at a measurement frequency of 10 GHz with a method and an apparatus in compliance with JIS C 2565.

The glass fiber-reinforced resin molded article of the present embodiment can include components other than the glass fiber and the resin as long as the object of the present invention is not compromised. Examples of such components can include glass fiber other than the glass fiber (e.g., E-glass fiber and S-glass fiber), reinforcing fiber other than glass fiber (e.g., carbon fiber and metal fiber), a filler other than glass fiber (e.g., glass powder, talc, and mica), a flame retardant, an UV absorber, a heat stabilizer, an antioxidant, an antistatic agent, a fluidity improver, an anti-blocking agent, a lubricant, a nucleating agent, an antibacterial agent, and pigment. The glass fiber-reinforced resin molded article of the present invention can contain these components in total in the range of 0 to 40% by mass with respect to the total amount of the glass fiber-reinforced resin molded article.

The glass fiber-reinforced resin molded article of the present embodiment can be obtained by molding a mixture composed of the above glass fiber, the above thermoplastic resin or thermosetting resin, and the above additives other than the glass fiber by a molding method appropriately selected, in accordance with the properties of the resin and additives and the application of the glass fiber-reinforced resin molded article, from known molding methods such as injection molding method, injection compression molding method, two-color molding method, hollow molding method, foam molding method (including supercritical fluid foam molding method), insert molding method, in-mold coating molding method, extrusion molding method, sheet molding method, thermal molding method, rotational molding method, laminate molding method, press molding method, blow molding method, stamping molding method, infusion method, hand lay-up method, spray-up method, resin transfer molding method, sheet molding compound method, bulk molding compound method, pultrusion method, and filament winding method.

The glass fiber-reinforced resin molded article of the present embodiment is preferably a glass fiber-reinforced resin injection molded article obtained by an injection molding method. The injection molding method, which includes a more excellent molding cycle than that of other molding methods, is suitable for efficient production of glass fiber-reinforced resin molded articles.

In particular, an injection molding method using thermoplastic resin pellets including glass fiber is preferably employed. In this case, as glass fiber to be included in the thermoplastic resin pellets, there can be employed chopped strands obtained by cutting glass fiber having the number of glass filaments constituting the glass fiber (number bundled) (also referred to as a glass fiber bundle or glass strand) of preferably 1 to 20000, more preferably 50 to 10000, and further preferably 1000 to 8000 into a length of preferably LU to 30.0 mm, more preferably 2.0 to 15.0 mm, and further preferably 2.3 to 7.8 mm, or cut fiber obtained by pulverizing the glass fiber so as to have a length of preferably 0.001 to 0.900 mm, more preferably 0.010 to 0:700 mm, and further preferably 0.020 to 0.500 mm by a known method such as a ball mill or Henschel mixer. Examples of the form of the glass fiber include rovings, in which the number of glass filaments constituting the glass fiber is 10 to 30000 and which are obtained without cutting, in addition to chopped strands and cut fiber.

A method for producing the thermoplastic resin pellets is not particularly limited. For example, the pellets can be produced by melt-kneading chopped strands or cut fiber and a thermoplastic resin as described above under known kneading conditions corresponding to the thermoplastic resin used using a twin-screw kneader or the like and extrusion-molding the kneaded product. Then, a glass fiber-reinforced resin molded article can be obtained by conducting injection molding using these thermoplastic resin pellets under known injection molding conditions corresponding to the thermoplastic resin used with an injection molding machine.

The number average fiber length L (μm) of the glass fiber included in the glass fiber-reinforced resin molded article can be adjusted by the length of the chopped strands or cut fiber to be included in the thermoplastic resin pellets, the kneading condition in the period from pellet formation to injection molding, and the injection molding conditions. For example, the number average fiber length L (μm) of the glass fiber included in the glass fiber-reinforced resin molded article can be made longer by lowering the screw rotation speed during twin-screw kneading and can be made shorter by elevating the screw rotation speed during twin-screw kneading, within the range of 10 to 1000 rpm, in the manufacturing process of the thermoplastic resin pellets.

Examples of applications of the glass fiber-reinforced resin molded article of the present embodiment can include electronic device housings, electronic components (connectors, sockets, LEDs, and sealed molded articles), vehicle exterior members (such as bumper, fender, bonnet, air dam, and wheel cover), vehicle interior members (such as door trim, ceiling material, and combination switch), vehicle engine members (such as cylinder head cover, oil pan, engine cover, intake manifold, intake air duct, air pipe, cooling fan, chain guide, tensioner, orifice for engine mount, impeller, air flow meter, ignition coil cover, actuator case, quick connector, and exhaust manifold), vehicle electrical components, vehicle mechanism components (pedal module, shift lever base, pulley, seal ring, gear, and bearing), and muffler components (such as silencers). Since a combination of a low dielectric constant and a low dielectric loss tangent is required, as applications of the glass fiber-reinforced resin molded article of the present embodiment, housings and parts of portable electronic devices such as smartphone, tablets, laptop computers, portable music players, and portable game machines are preferable. The glass fiber-reinforced resin molded article of the present embodiment is suitable in an environment where high-frequency region signals flow, but can be beneficially used also in an environment where no high-frequency region signal flows.

Examples and Comparative Examples of e present invention will be shown.

EXAMPLES

[Glass Composition]

Three glass compositions shown in Table 1 were used. Here, a composition A is the glass composition of the glass fiber used in the glass fiber-reinforced resin molded article of the present invention, a composition B is the composition of the glass fiber used in the glass fiber-reinforced resin molded article of Patent Literature 1, and a composition C is a generally used E glass composition. In Table 1, the dielectric constant and dielectric loss tangent at a measurement frequency of 1 MHz are values measured in compliance with IEC 62631-2-1, and the dielectric constant and dielectric loss tangent at a measurement frequency of 1 GHz or 10 GHz are values measured in compliance with KS C 2565:1992.

TABLE 1

|  | Composition A | Composition B | Composition C |
|---|---|---|---|
| $SiO_2$ (% by mass) | 55.0 | 54.5 | 54.6 |
| $B_2O_3$ (% by mass) | 24.0 | 19.4 | 6.1 |
| $Al_2O_3$ (% by mass) | 12.0 | 14.6 | 14.1 |
| SrO (% by mass) | 4.0 | 0 | 0 |
| MgO (% by mass) | 2.0 | 4.2 | 1.2 |
| CaO (% by mass) | 2.0 | 4.1 | 22.4 |
| $F_2$ (wt %) | 1.0 | 1.0 | 0.6 |
| $Cl_2$ (% by mass) | 0 | 0 | 0 |
| $TiO_2$ (wt %) | 0 | 1.9 | 0.3 |
| $Fe_2O_3$ (wt %) | 0 | 0.1 | 0.2 |

TABLE 1-continued

|  | Composition A | Composition B | Composition C |
|---|---|---|---|
| $Li_2O + Na_2O + K_2O$ (wt %) | 0 | 0.2 | 0.5 |
| $((F_2 + Cl_2)\hat{\ }(1/8) \times B_2O_3\hat{\ }3 \times Al_2O_3)/$ $(1000 \times SrO\hat{\ }(1/2))$ | 82.9 | — | — |
| Dielectric constant (measurement frequency: 1 MHz) | — | 5.0 | — |

TABLE 1-continued

|  | Composition A | Composition B | Composition C |
|---|---|---|---|
| Dielectric loss tangent (measurement frequency: 1 MHz) | — | 0.0007 | — |
| Dielectric constant (measurement frequency: 1 GHz) | 4.5 | 4.8 | 6.8 |
| Dielectric loss tangent (measurement frequency: 1 GHz) | 0.0009 | 0.0014 | 0.0035 |
| Dielectric constant (measurement frequency: 10 GHz) | 4.4 | 4.7 | 6.6 |
| Dielectric loss tangent (measurement frequency: 10 GHz) | 0.0018 | 0.0025 | 0.0061 |

[Resin]

As a polybutylene terephthalate resin (denoted by PBT in the table), DURANEX 2000 (trade name, manufactured by Polyplastics Co., Ltd.) was used. Additionally, used was a polyetheretherketone resin (denoted by PEEK in the table) having a dielectric constant of 3.31 and a dielectric loss tangent of 0.00187 at a measurement frequency of 1 GHz and a dielectric constant of 3.18 and a dielectric loss tangent of 0.00287 at a measurement frequency of 10 GHz.

[Dielectric Constant]

The dielectric constant of the glass fiber-reinforced resin molded article was measured in compliance with HS C 2565. The measurement frequency is 1 GHz or 10 GHz.

[Dielectric Loss Tangent]

The dielectric loss tangent of the glass fiber-reinforced resin molded article was measured in compliance with JIS C 2565. The measurement frequency is 1 GHz or 10 GHz.

Example 1 and Comparative Examples 1 to 2

The glass chopped strands of 3 mm in fiber length each comprising the composition A, composition B, or composition C and PBT as shown in Table 2 were kneaded in a twin-screw kneader (manufactured by Toshiba Machine Co., Ltd., trade name: TEM-26SS) to produce resin pellets. Glass fiber-reinforced resin molded articles (flat plates of 1 mm in thickness) obtained by conducting injection molding using the obtained resin pellets in an injection molding apparatus (manufactured by Nissei Plastic Industrial Co. Ltd., trade name: NEX80) were evaluated for the number average fiber length of the glass fiber, dielectric constant, and dielectric loss tangent by the methods described above.

TABLE 2

|  |  | Example 1 | Comparative Example 1 | Comparative Example 2 |
|---|---|---|---|---|
| Glass fiber | Composition | Composition A | Composition B | Composition C |
|  | Fiber diameter (μm) | 11 | 11 | 11 |
|  | Coating  Resin type | Epoxy | Epoxy | Epoxy |
|  | Coating ratio (wt %) | 1.0 | 1.0 | 1.0 |
|  | Number average fiber length in molded article (μm) | 231 | 235 | 248 |
|  | Content in molded article (wt %) | 30.0 | 30.0 | 30.0 |
| Resin | Resin type | PBT | PBT | PBT |
|  | Content in molded article (wt %) | 70.0 | 70.0 | 70.0 |
| Molded article | 10 GHz dielectric constant | 3.13 | 3.19 | 3.40 |
|  | 1 GHz dielectric constant | 3.23 | 3.29 | 3.51 |
|  | (10 GHz dielectric constant)/ (1 GHz dielectric constant) | 0.97 | 0.97 | 0.97 |
|  | 10 GHz dielectric loss tangent | 0.00513 | 0.00531 | 0.00637 |
|  | 1 GHz dielectric loss tangent | 0.00624 | 0.00625 | 0.00685 |
|  | (10 GHz dielectric loss tangent)/ (1 GHz dielectric loss tangent) | 0.82 | 0.85 | 0.93 |

As shown in Table 2, it can be seen that, in the glass fiber-reinforced resin molded article of Example 1 comprising the glass composition defined in the present invention (composition A), the dielectric constant and dielectric loss tangent at 10 are reduced and particularly, the dielectric loss tangent at 10 GHz is markedly reduced, in comparison with the glass fiber-reinforced resin molded article of Comparative Example 1 or 2, which comprises exactly the same composition as that of Example 1 except for the glass composition.

Example 2 and Comparative Examples 3

The cut fiber of 0.030 rum in fiber length comprising the composition A or the cut fiber of 0.030 mm in fiber length comprising the composition B (the fiber length of the cut fiber comprising the composition B may range from 0.001 to 0.300 mm) and PBT as shown in Table 3 were kneaded in a twin-screw kneader (manufactured by Toshiba Machine Co., Ltd., trade name: TEM-26SS) to produce resin pellets. Glass fiber-reinforced resin molded articles (flat plates of 1 mm in thickness) obtained by conducting injection molding using the obtained resin pellets in an injection molding apparatus (manufactured by Nissei Plastic Industrial Co. Ltd., trade name: NEX80) were evaluated for the number average fiber length of the glass fiber, dielectric constant, and dielectric loss tangent by the methods described above.

TABLE 3

|  |  | Example 2 | Comparative Example 3 |
|---|---|---|---|
| Glass fiber | Composition | Composition A | Composition B |
|  | Fiber diameter (μm) | 11 | 11 |
|  | Number average fiber length in molded article (μm) | 18 | 17 |
|  | Content in molded article (wt %) | 30 | 30 |

TABLE 3-continued

|  |  | Example 2 | Comparative Example 3 |
|---|---|---|---|
| Resin | Resin type | PBT | PBT |
|  | Content in molded article (wt %) | 70 | 70 |
| Molded article | 10 GHz dielectric constant | 3.10 | 3.17 |
|  | 1 GHz dielectric constant | 3.20 | 3.27 |
|  | (10 GHz dielectric constant)/ (1 GHz dielectric constant) | 0.97 | 0.97 |
|  | 10 GHz dielectric loss tangent | 0.00511 | 0.00530 |
|  | 1 GHz dielectric loss tangent | 0.00623 | 0.00625 |
|  | (10 GHz dielectric loss tangent)/ (1 GHz dielectric loss tangent) | 0.82 | 0.85 |

Example 3 and Comparative Examples 4

The glass chopped strands of 3 mm in fiber length each having the composition A or the composition B and PEEK as shown in Table 4 were kneaded in a twin-screw kneader (manufactured by Toshiba Machine Co., Ltd., trade name: TEM-26SS) to produce resin pellets. Glass fiber-reinforced resin molded articles (flat plates of 1 mm in thickness) obtained by conducting injection molding using the obtained resin pellets in an injection molding apparatus (manufactured by Nissei Plastic Industrial Co. Ltd., trade name: NEX80) were evaluated for the number average fiber length of the glass fiber, dielectric constant, and dielectric loss tangent by the methods described above.

TABLE 4

|  |  | Example 3 | Comparative Example 4 |
|---|---|---|---|
| Glass fiber | Composition | Composition A | Composition B |
|  | Fiber diameter (μm) | 11 | 11 |
|  | Number average fiber length in molded article (μm) | 220 | 226 |
|  | Content in molded article (wt %) | 40 | 40 |
| Resin | Resin type | PEEK | PEEK |
|  | Content in molded article (wt %) | 60 | 60 |
| Molded article | 10 GHz dielectric constant | 3.78 | 3.86 |
|  | 1 GHz dielectric constant | 3.91 | 3.99 |
|  | (10 GHz dielectric constant)/ (1 GHz dielectric constant) | 0.97 | 0.97 |
|  | 10 GHz dielectric loss tangent | 0.00211 | 0.00270 |
|  | 1 GHz dielectric loss tangent | 0.00122 | 0.00152 |
|  | (10 GHz dielectric loss tangent)/ (1 GHz dielectric loss tangent) | 1.73 | 1.78 |

As shown in Table 4, it can be seen that, in the glass fiber-reinforced resin molded article of Example 3 comprising the glass composition defined in the present invention (composition A), the dielectric constant and dielectric loss tangent at 10 GHz are reduced and particularly, the increase in the dielectric loss tangent at 10 GHz is markedly suppressed, in comparison with the glass fiber-reinforced resin molded article of Comparative Example 4, comprising exactly the same composition as that of Example 1 except for the glass composition.

The invention claimed is:

1. A glass fiber-reinforced resin molded article containing glass fiber in a range of 10 to 90% by mass and a resin in a range of 90 to 10% by mass with respect to a total amount of the glass fiber-reinforced resin molded article, wherein
the glass fiber comprises a composition including $SiO_2$ in a range of 52.0 to 59.5% by mass, $B_2O_3$ in a range of 22.4 to 25.5% by mass, $Al_2O_3$ in a range of 9.0 to 14.0% by mass, SrO in a range of 0.5 to 6.0% by mass, MgO in a range of 1.0 to 5.0% by mass, CaO in a range of 1.0 to 5.0% by mass, and $F_2$ and $Cl_2$ in a range of 0.1 to 2.5% by mass in total with respect to a total amount of the glass fiber, and
the glass fiber has a number average length of 1 to 10000 μm.

2. The glass fiber-reinforced resin molded article according to claim 1, wherein the glass fiber has a number average fiber length of 100 to 450 μm.

3. The glass fiber-reinforced resin molded article according to claim 1, wherein the glass fiber has a number average fiber length of 3 to 25 μm.

4. The glass fiber-reinforced resin molded article according to claim 1, wherein the resin included in the glass fiber-reinforced resin molded article is a thermoplastic resin having a dielectric constant of less than 5.0.

5. The glass fiber-reinforced resin molded article according to claim 4, wherein the thermoplastic resin is a polybutylene terephthalate resin.

* * * * *